United States Patent [19]

Blair et al.

[11] Patent Number: 4,495,329

[45] Date of Patent: Jan. 22, 1985

[54] PHENOLIC RESIN COMPOUNDS

[75] Inventors: Robert E. Blair, Columbus; Michael R. Peede, Ahoskie, both of Ohio

[73] Assignee: Georgia-Pacific Resins, Inc., Atlanta, Ga.

[21] Appl. No.: 580,701

[22] Filed: Feb. 16, 1984

Related U.S. Application Data

[63] Continuation-in-part of Ser. No. 479,125, Mar. 28, 1983, abandoned, which is a continuation of Ser. No. 385,124, Jun. 4, 1982, abandoned, which is a continuation of Ser. No. 224,103, Jan. 5, 1981, abandoned.

[51] Int. Cl.$^3$ .............................................. C08K 5/10
[52] U.S. Cl. ................................... 524/774; 524/775; 524/287; 428/526
[58] Field of Search ................................ 524/774, 775

[56] References Cited

U.S. PATENT DOCUMENTS

| | | |
|---|---|---|
| 1,720,051 | 7/1929 | Norton . |
| 1,848,724 | 3/1932 | Jaeger . |
| 1,910,338 | 5/1933 | Howard . |
| 1,978,710 | 10/1934 | Jaeger . |
| 1,982,787 | 12/1934 | Cherry . |
| 2,006,345 | 7/1935 | Carswell . |
| 2,056,461 | 10/1936 | Howard . |
| 2,082,790 | 6/1937 | Cherry . |
| 2,115,710 | 5/1938 | Dreyfus . |
| 2,134,388 | 10/1938 | Cherry . |
| 2,205,427 | 6/1940 | Loos . |
| 2,321,766 | 6/1943 | Murdock . |
| 2,437,284 | 3/1948 | Watson . |
| 2,437,657 | 3/1948 | West et al. . |
| 2,506,903 | 5/1950 | Smith et al. . |
| 2,506,904 | 5/1950 | Smith et al. . |
| 2,560,319 | 7/1951 | West et al. . |
| 3,298,918 | 1/1967 | Hicks et al. . |
| 3,457,211 | 7/1969 | Imoto et al. . |
| 3,801,340 | 4/1974 | Ellis . |

FOREIGN PATENT DOCUMENTS

| | | |
|---|---|---|
| 210276 | 8/1955 | Australia . |
| 467272 | 8/1950 | Canada . |
| 553568 | 2/1958 | Canada . |
| 704434 | 2/1965 | Canada . |
| 1965376 | 7/1970 | Fed. Rep. of Germany . |
| 1963990 | 7/1971 | Fed. Rep. of Germany . |
| 2261111 | 6/1973 | Fed. Rep. of Germany . |
| 329313 | 6/1930 | United Kingdom . |
| 345310 | 4/1931 | United Kingdom . |
| 358603 | 11/1931 | United Kingdom . |
| 800998 | 9/1958 | United Kingdom . |

OTHER PUBLICATIONS

137,244 Japanese (Abstract).
119,832 U.S.S.R. (Abstract).

*Primary Examiner*—Paul R. Michl
*Attorney, Agent, or Firm*—Banner, Birch, McKie & Beckett

[57] ABSTRACT

A phenol-aldehyde resole resin is disclosed which is produced in the presence of a plasticizing amount of a phenolic ester reaction product of an unsaturated fatty acid with a phenol. These compositions are characterized by improved flexibility and moisture resistance. The resins are especially useful for impregnating cellulosic materials. Particular utility has been found for these compositions as filter elements wherein the impregnated cured paper can be corrugated after curing without cracking to provide an economical and superior filter paper.

15 Claims, No Drawings

PHENOLIC RESIN COMPOUNDS

BACKGROUND OF THE INVENTION

This is a continuation-in-part of Ser. No. 479,125 filed Mar. 28, 1983, abandoned, which is a continuation of Ser. No. 385,124, filed June 4, 1982, now abandoned, which is a continuation of Ser. No. 224,103, filed Jan. 5, 1981, now abandoned.

1. Field of the Invention

This invention relates to internally plasticized phenolic resin compositions. More particularly, this invention relates to a composition, a process for the preparation of, and the use of a phenolic resole resin internally plasticized with a phenolic ester reaction product of an unsaturated fatty acid with a phenol.

2. Description of the Prior Art

Phenol-formaldehyde condensates of the resole type are used extensively to treat cellulose compounds and particularly to impregnate paper substrates. Upon curing to a substantially insoluble and infusible stage, the resinous material imparts chemical resistance and structural strengths to the substrates for use in a variety of applications. A specific application for a phenolic resole in this manner is in the manufacture of filter media for both air and oil filtering systems and particularly for both stationary and mobile internal combustion engines.

The fabrication of filter structures of the foregoing type involve the following manufacturing operations. In the first or treating step, a continuous roll of paper is conventionally impregnated with a phenolic resole in the form of an alcohol solution of a condensate of phenol with formaldehyde. The saturated paper is heated to remove solvent and the treated paper is then corrugated for the purpose of increasing surface area. The corrugated sheet is subsequently conveyed through an oven in order to advance the cure of the resinous impregnate to a fusible intermediate or B stage, and then rolled again. B staging may be immediate to or time removed from the saturation step.

The rolls of the partially cured corrugated impregnated paper are provided in this manner to the filter manufacturer for completion of the manufacturing sequence. The latter initially involves appropriately pleating the paper and then heat-curing it to the final thermoset stage in order to achieve a desired degree of chemical, oil and moisture resistance for the filter medium.

The standard phenolic resins used to treat filter paper have a disadvantage in that the number of folding or corrugating operations involved in the manufacture causes the filter material to be brittle and crack. Numerous plasticizers which have been developed to eliminate this difficulty have not been entirely satisfactory. Generally speaking, plasticizers of low molecular weight have a disadvantage in that they are eventually dissipated with the lapse of time and thus the compositions are rendered brittle. This is especially true when there is some hiatus in the manufacturing procedure. Plasticizers of high molecular weight preclude such phenomenon, but compatibility problems with the base resin can occur.

Additionally, thermosetting resins such as phenol-formaldehyde resins have been used extensivly as adhesives, laminates, molding materials, paints and the like and improvements to improve flexibility without decreasing tensile strength are desirable along with improved moisture resistance for these purposes. Therefore, a need exists for an economical and efficient plasticized phenol-formaldehyde resin composition to overcome the shortcomings of the conventional plasticized phenol-formaldehyde.

SUMMARY OF THE INVENTION

The present invention provides internally plasticized phenolaldehyde resin compositions, a process for preparing these compositions and the use of these compositions as impregnating and/or laminating agents for various substrates but particularly for cellulosic materials.

In accordance with this invention there is provided a thermosetting phenolic resin composition comprising a phenol-aldehyde resole resin produced in the presence of a plasticizing amount of a phenol ester reaction product, said product being made by the reaction of an unsaturated fatty acid containing from 8 to 22 carbon atoms and a phenol in the presence of a mineral acid.

In addition, the invention contemplates a process for preparing a phenol-adehyde resole resin composition which comprises the steps of:

(a) providing a phenolic ester reaction product of unsaturated fatty acid containing 8 to 22 carbon atoms, a phenol and mineral acid;

(b) forming an aqueous alkaline mixture of phenol-aldehyde and a plasticizing amount of said phenolic ester reaction product;

(c) reacting said aqueous mixture under alkaline conditions to provide an internally plasticized phenol-aldehyde resole resin.

The phenolic ester fatty acid-modified phenol-aldehyde resin compositions of this invention are characterized by being internally plasticized, having more linear chains, limited branching and a lowered cross-linking index which results in increased resin flexibility in increased flex fatique resistance and in moisture resistance. These resins can readily be produced with very low (e.g., less than about 1%) free formaldehyde.

The present invention also contemplates a cellulosic substrate impregnated with a dried and cured resin composition of the present invention and, particularly, contemplates paper filter elements.

DESCRIPTION OF THE PREFERRED EMBODIMENTS

The ester reaction product employed in accordance with this invention is an ester of a phenol and an unsaturated fatty acid. The phenol moiety can be phenol per se, m-cresol, p-cresol, o-cresol or alkyl derivative of phenol, such as t-butylphenol octylphenol, and the like. Among these, phenol itself is preferred.

The fatty acids contemplated for use in this invention are unsaturated fatty acids containing 8 to 22 carbon atoms. Such fatty acids may be obtained from oils including drying oils and semi-drying oils. Specific representative oils include soybean oil, linseed oil, tall oil, safflower oil and the like. Soybean oil and tall oil are preferred due to economical advantages. Of course, fatty acids obtained from other sources and purified fatty acids can also be used. The fatty acids include, inter alia, linoleic, linolenic and, oleic.

The phenolic ester reaction product (i.e., plasticizer) can be produced by the use of acid catalysts and by carrying out the esterfication reaction under moderately elevated reaction conditions. Accordingly, the reaction can be accomplished efficiently by refluxing a mixture of an unsaturated fatty acid and a phenol in the presence of a small amount of a mineral acid as catalyst.

The process involved is an equilibrium reaction and the attainment of equilibrium is greatly enhanced by a trace of hydrogen ion. These reactions can take place at reflux temperatures from about 110° to about 200° C. There is nothing particularly critical in carrying out the reaction in this temperature range and, indeed, if longer reaction times can be tolerated, lower temperatures can be used including the use of vacuum for refluxing purposes. At the end of the reaction, the hydrogen ion in the mixture is desirably neutralized (e.g., as by adding a base such as sodium hydroxide). The phenol ester reaction product generated by the acid catalysis reaction is predominantly an ester with ketone and alkylate as secondary components of the plasticizer product. Other methods of producing the ester are known in the art.

The plasticizer product of this invention is not soluble in water but is soluble in a basic aqueous solution of phenol and aldehyde such as that conventionally used in the manufacture of a phenol formaldehyde resole resin.

Commercial fatty acids obtained from refined tall oil may contain small amounts of rosin acids as impurities. If rosin acids are present, neutralization after esterification with sodium hydroxide can result in the formation of undesirable lumps in the ester solution. This can be avoided by the use of a basic amine (e.g., diethyl or triethylamine) for the final neutralization.

According to the present invention, the phenol and aldehyde are reacted to form a resole in the presence of a plasticizing amount of the phenolic ester reaction product. Such reaction generally follows the reaction conditions normally observed for preparing conventional resole condensate, namely, the use of a basic catalyst and carrying out the condensation under moderately elevated reaction condition. This invention broadly contemplates the use of resole of the ester reaction product modified resole versus resins well known in the art.

In a resole, the phenol, which may be phenol itself or a substituted phenol such as described above, is often reacted on the basis of one mole with from about 1 to about 1.8 moles of the aldehyde. More preferably, from about 1 to about 1.4 moles of aldehyde are employed per mole of the phenol. Aldehydes which can be used include, formaldehyde, acetaldehyde, propionaldehyde, benzaldehyde, furfural, or the like. Formaldehyde is preferred for the practice of this invention and can be supplied to the reaction mixture, for example, as formalin or paraformaldehyde.

As in the preparation of conventional resoles, a basic catalyst is used. Representative catalysts are the hydroxides of alkali metals with sodium hydroxide most often chosen for use. Conventionally, the pH of the medium is maintained above 7 and often from about 7 to about 9.

The amount of phenol ester reaction product employed in the manufacture of the phenol-formaldehyde resin will vary depending upon the particular properties desired for the end product. The amounts suitable for any given application readily can be determined by one of ordinary skill in the art. Generally, however, the phenol ester reaction product will be added in amounts ranging from about 5 to about 20% by weight based on the total weight of the phenol-formaldehyde resin and the phenol-ester reaction product. However, in some applications, such as coatings, the phenol ester reaction product may be present in amounts of up to about 50% or more.

The condensation reaction is generally carried out until the resole contains less than about 1% free formaldehyde. Such resin is capable of curing to a thermoset condition in from about 100 to about 150 sec. in accordance with the Stroke cure test. This is a standard test procedure prevalently used in preparing a phenolic resin in order to determine an end point of a cook. In accordance with the test, a one-half gram sample of the phenol resin is spread upon the surface of a cure plate maintained at 150° C. to cover an area of approximately 2 square cm. The time in seconds is then noted when the film sets up to a hard infusible stage.

Upon obtaining an end point as noted, the phenol resin conventionally is cooled to a temperature in the range of from about 40° to 60° C. and vacuum dehydrated. The dehydration is carried out until the free water or moisture content is not in excess of about 5 weight percent. The Karl Fischer moisture determination method (ASTM Method E203) is the procedure conventionally used for this purpose. After the requisite degree of dehydration is realized the dehydrated product is cut back with a polar solvent to provide a solution usually containing from 50 to 65 percent solids. The lower alcohols represent the preferred solvents although ketones and the like can be used.

The improved properties, and especially the improved foldability resistance, flexibility and moisture resistance characteristics exhibited by the phenolic fatty acid ester reaction product phenol-formaldehyde resole resin compositions of this invention make them eminently suitable for a wide variety of end-uses such as adhesives, impregnating agents, insulating materials, laminating resins, molding and reinforcing materials, paints, coating resins and the like. The resins of this invention are useful for imparting the improved characteristics to any porous sheet material (organic, inorganic or mixtures thereof) having pores extending from surface to surface. Two or more layers of the same or varying porosity can be employed in close juxtaposition, or even bonded together, but also spaced apart by suitable spacing sheets.

The invention is applicable to papers and like sheet materials formed of any type of fiber including not only cellulose fibers, but also synthetic thermoplastic and nonthermoplastic resin fibers, glass fibers and fibers of other cellulose derivatives. Also useful, in addition to papers, are textile fabrics and woven and nonwoven fibrous layers such as felts, mats and bats made of fibrous materials of any of the types listed above. Such materials can also contain pigments and other particulate matter.

Typically, an impregated sheet member will contain from about 5 to about 20 weight percent (based on total impregnated sheet member weight) of solids derived from the phenolic resin of this invention. Preferably, this impregnated sheet member has such solids substantially uniformly distributed throughout such member. As noted earlier, the resin composition of this invention is particularly suitable for filters including oil filters for automobiles and the like.

The internally plasticized phenolic resins of this invention can also be used alone or as a mixture with conventional phenolic resins for preparing varnishes, coatings or the like. Laminates can also be produced by molding materials impregnated with the resin of this material. Such laminates, coatings and the like have excellent flexibility characteristics and moisture resistance.

Further details regarding the preparation of the phenolic resins of this invention are given in the following working examples which are included for illustrative purposes and are not intended to limit the scope of the invention. All parts and percentages noted therein are by weight unless otherwise indicated.

EXAMPLE I

Part A

A suitable mixing vessel equipped with an agitator and a heating means was charged with 70.23 parts of soybean fatty acid (Proctor and Gamble product S-210). To this, 24.82 parts of phenol (99.8%) was added. This mixture was agitated and heated to 50° C. At 50° C., 2.61 parts of sulfuric acid (97.4%) was charged to the fatty acid-phenol mixture over a 2-minute period. The contents of the vessel were agitated and heated over a period of 4 hours to 204° C. The contents were reacted for 15 minutes at 204° C. and allowed to cool to 135° C., at which point 2.34 parts of sodium hydroxide (50%) was added to neutralize the material. The material was discharged into a clean dry container. The properties of the resultant phenol ester reaction were as shown in Table 1.

TABLE 1

| pH: | 6.5 |
|---|---|
| Specific Gravity: | 0.986 |
| % Free Phenol: | 11.5 |
| Solid Content: | no cure unless crosslinked with resin |
| Viscosity: | 800 cps |

To a suitable mixing vessel equipped with an agitator, thermometer, a heating means and a condenser, 1825.6 parts of phenol (99.8%) was added. To this, 1196.0 parts of formaldehyde (50%) was added (to provide 1.02:1 ratio) and 363.8 parts of the ester reaction product described in Part A was added and agitated.

To this mixture 39.2 parts of sodium hydroxide (25%) was added. The agitated mixture was heated to 60° C. and allowed to exotherm to 95° C. The mixture was reacted at 95° C. while monitoring the pH. During this reaction 17.12 parts additional sodium-hydroxide was added to maintain a pH of 7.0–7.5. The mixture was reacted at 95° C. to a percent Free Formaldehyde of 1.0% or less (as determined by G.P.A.M. 203.3) and a 150° C. hot plate Stroke cure (as determined by G.P.A.M. 207.1) of 120 seconds. The resin was then cooled to 60° C. and the reaction vessel set up for vacuum distillation.

The resin was then distilled at 60°–65° C. under 23–24 inches of vacuum until 607 parts water had been removed into a distillation flask. The mixture was cooled to 40° C. and 633.85 parts methyl alcohol as well as 58.75 parts methyl ethyl ketone were added. The physical properties were as shown in Table 2.

TABLE 2

| Viscosity: | 430 cps |
|---|---|
| Specific Gravity: | 1.100 |
| pH: | 7.7 |
| Refractive Index | 1.5250 |
| 150° C. Stroke cure: | 121 |
| % Free Phenol: | 11.34 |
| % Free Formaldehyde: | 1.00 |
| Solids Content: | 65.00 |
| % Water | 4.30 |
| Apparent average Molecular Weight: | 2454 |

EXAMPLE IA

The procedure of Example 1 was repeated and provided the following product characteristics.

TABLE 3

| Phenol Ester Reaction Product | 55.6% |
|---|---|
| Ester: | 22.8% by weight |
| Ketone: | 11.9% by weight |
| Alkylate | 20.9% by weight |
| Unreacted SBFA | 36.0 |
| Water | 1.7 |
| Free Phenol | 6.6 |

EXAMPLE II

The ester reaction product modified phenolic resin produced in Example I was evaluated as a filter paper impregnant noting the relevant physical properties particularly with regard to fold fatigue characteristics imparted to the filter paper both before and after curing the treated paper. The latter properties were determined in accordance with standardized test methods. For comparison purposes several commercial phenolic resins conventionally used were included and referred to hereinbelow as exemplary of the prior art.

In conducting these tests 6"×8" size sheets of standard filter paper were impregnated with the respective resin solutions (diluted with methanol) to provide about 28%+0.3% resin solids pick-up. The procedure for treating the impregnated paper in order to advance the resin component to a B stage involved air drying and then heating in a forced air oven at 150° C. for 2 minutes. The paper was conditioned at 60% Relative Humidity for 10 minutes. Strips ½"×4" were cut and then placed in a Tinius-Olsen fold tester. The number of folds were counted at 0.25 Kg tension until the paper breaks. Three commercial phenol formaldehyde resoles resins, GP 5157 (Resin A); GP 5165 (Resin B); and GP 5135 (Resin C) (all available from Georgia-Pacific) were used for comparison. All three GP resins are NaOH-catalyzed resole resins. GP 5157 has a formaldehyde:phenol mole ratio of 1.1:1, a pH of 7.2–7.8, a solids content of 60–62%, a specific gravity of 1.124–1.138 and a 135° C. Stroke cure of 2–4 minutes. GP 5165 has a formaldehyde:phenol mole ratio of 1:1, a pH of 7.6–8.2, a solids content of 62–66%, a specific gravity of 1.110–1.160; a $H_2O$ content of 4–5% and 150° C. Stroke cure of 90–120 sec. GP 5135 has a formaldehyde:phenol mole ratio of 1.16:1, a pH of 7.8–8.2, a solids content of 62–66%, a specific gravity of 1.116–1.124, a $H_2O$ content Of 3–5%, and a 150° C. stroke cure of 60–80 sec.

The results of all tests are set forth in Table 4.

TABLE 4

| Test | Invention | Resin A | Resin B | Resin C |
|---|---|---|---|---|
| 1 | 63 | 2 | 10 | 5 |
| 2 | 48 | 1 | 9 | 4 |
| 3 | 71 | 2 | 8 | 5 |
| 4 | 39 | 2 | 8 | 5 |
| 5 | 47 | 2 | 7 | 5 |
| 6 | 58 | 2 | 8 | 4 |
| 7 | 61 | 3 | 6 | 5 |
| 8 | 62 | 2 | 8 | 4 |
| 9 | 63 | 2 | 9 | 4 |
| 10 | 59 | 1 | 8 | 5 |

The fold test results clearly indicate that the ester-modified phenolic resin imparted superior flexibility and flex fatigue resistance, on B staged paper than the other conventional resins so treated. This data also indicates that the ester provided internal plasticization for the phenol aldehyde resin. Furthermore, liquid chromatographic analysis of the conventional phenolic resin compared with the ester-modified phenolic resin indiates that incorporation of the ester ties up some of the reactive sites on the phenol component of the phenol formaldehyde resin and in turn methylation and condensation are somewhat retarded. Chromatograms generally show lower apparent molecular weight fractions with the incorporation of the ester. The tying up of reactive sites on the phenol allows a more linear chain polymer with limited branching and lower cross-linking indexes.

Since modifications will be apparent to those skilled in the art, it is intended that this invention be limited only by the scope of the appended claims.

We claim:

1. A thermosetting phenolic resin compositions comprising a phenol-aldehyde resole resin produced in the presence of a plasticizing amount of a phenolic ester reaction product, said product being made by the reaction of an unsaturated fatty acid containing from 8 to 22 carbon atoms and a phenol in the presence of a mineral acid.

2. The composition according to claim 1, wherein the said unsaturated fatty acid is selected from the group consisting of linoleic acid, linolenic acid, and oleic acid.

3. The composition according to claim 1, wherein said phenol component of the ester is selected from the group consisting of phenol, m-cresol, p-cresol, o-cresol, t-buylphenol, or octylphenol.

4. The composition according to claim 2, wherein said fatty acid is derived from soybean oil.

5. The composition according to claim 1, wherein said fatty acid is derived from tall oil.

6. The composition according to claim 1, wherein said resole resin is phenol-formaldehyde resole resin.

7. A process for preparing a phenol-aldehyde resole resin composition which comprises the steps of:
   (a) providing a phenolic ester reaction product of unsaturated fatty acid containing 8 to 22 carbon atoms, a phenol and mineral acid,
   (b) forming an aqueous alkaline mixture of phenol, aldehyde and a plasticizing amount of phenolic ester reaction product,
   (c) reacting said aqueous mixture under alkaline conditions to provide an internally plasticized phenol aldehyde resin.

8. The process according to claim 7, wherein the mole ratio of aldehyde to phenol in the resole ranges from about 1:1 to about 1.8:1.

9. A flexible substrate impregnated with a thermosetting phenolic resin composition comprising a phenol-aldehyde resole resin produced in the presence of a plasticizing amount of a phenolic ester reaction mixture of an unsaturated fatty acid containing from 8 to 22 carbon atoms.

10. The flexible substrate according to claim 9, wherein the phenol-aldehyde resin is phenol-formaldehyde, the phenolic component of the ester reaction product is phenol and the unsaturated fatty acid is derived from tall oil.

11. The flexible substrate according to claim 9, wherein the substrate is paper.

12. The flexible substrate according to claim 9, wherein the flexible substrate is cork.

13. A filter element comprising a cellulosic base member impregnated with a thermosetting phenol-aldehyde resole resin produced in the presence of a phenolic ester reaction mixture of a unsaturated fatty acid containing from 8 to 22 carbon atoms.

14. A filter element comprising a cellulosic base member impregnated with a cured phenol-aldehyde resole resin manufactured in the presence of a phenolic ester reaction mixture of an unsaturated fatty acid containing from 8 to 22 carbon atoms.

15. An automobile oil element according to claim 14.

* * * * *